(12) United States Patent
Mackilligin et al.

(10) Patent No.: US 10,844,232 B2
(45) Date of Patent: Nov. 24, 2020

(54) THERMOCHROMIC PAINT

(71) Applicant: ROLLS-ROYCE plc, London (GB)

(72) Inventors: Harry Mackilligin, Nottingham (GB);
Neil Champness, Nottingham (GB);
Peter Licence, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 55 days.

(21) Appl. No.: 16/324,896

(22) PCT Filed: Jul. 17, 2017

(86) PCT No.: PCT/EP2017/068005
§ 371 (c)(1),
(2) Date: Feb. 11, 2019

(87) PCT Pub. No.: WO2018/028943
PCT Pub. Date: Feb. 15, 2018

(65) Prior Publication Data
US 2019/0345347 A1    Nov. 14, 2019

(30) Foreign Application Priority Data

Aug. 10, 2016  (GB) .................... 1613726.7

(51) Int. Cl.
| | |
|---|---|
| *C09D 5/29* | (2006.01) |
| *C09D 7/61* | (2018.01) |
| *C09D 5/26* | (2006.01) |
| *C09D 133/00* | (2006.01) |
| *C09D 183/04* | (2006.01) |

(52) U.S. Cl.
CPC ............. *C09D 5/29* (2013.01); *C09D 5/26* (2013.01); *C09D 7/61* (2018.01); *C09D 133/00* (2013.01); *C09D 183/04* (2013.01)

(58) Field of Classification Search
None
See application file for complete search history.

(56) References Cited

U.S. PATENT DOCUMENTS

| | | | | |
|---|---|---|---|---|
| 4,344,909 | A * | 8/1982 | De Blauwe | B29C 61/06 264/230 |
| 4,425,161 | A * | 1/1984 | Shibahashi | B41M 5/282 106/31.17 |
| 6,682,665 | B2 * | 1/2004 | Watson | C09D 5/26 252/408.1 |

(Continued)

FOREIGN PATENT DOCUMENTS

| | | |
|---|---|---|
| CN | 101760111 A | 6/2010 |
| CN | 103911069 A | 7/2014 |

(Continued)

OTHER PUBLICATIONS

Dec. 14, 2016 Search Report issued in British Patent Application No. 1613726.7.

(Continued)

*Primary Examiner* — Peter A Salamon
(74) *Attorney, Agent, or Firm* — Oliff PLC

(57) ABSTRACT

A thermochromic paint including: 1 wt % to 90 wt % binder; 2 wt % to 40 wt % filler comprising an inorganic oxide; and 0.1 wt % to 28 wt % organic compound including a chromophore. The paint provides an irreversible indication of maximum temperature.

14 Claims, 3 Drawing Sheets

(56) References Cited

U.S. PATENT DOCUMENTS

2003/0049847 A1\* 3/2003 Watson .................... C09D 5/26
                                                                    436/2
2019/0345347 A1\* 11/2019 Mackilligin ......... C09D 133/00

FOREIGN PATENT DOCUMENTS

| CN | 103912612 A | 7/2014 |
|----|-------------|--------|
| CN | 104893568 A | 9/2015 |
| EP | 1 288 266 A1 | 3/2003 |
| EP | 1 288 267 A1 | 3/2003 |
| EP | 1 447 431 A1 | 8/2004 |
| EP | 1 614 724 A2 | 1/2006 |
| EP | 1 944 340 A2 | 7/2008 |

OTHER PUBLICATIONS

Sep. 20, 2017 International Search Report issued in International Patent Application No. PCT/EP2017/068005.

Sep. 20, 2017 Written Opinion of the International Searching Authority issued in International Patent Application No. PCT/EP2017/068005.

\* cited by examiner

THERMOCHROMIC PAINT

The present disclosure concerns a thermochromic paint which may be used as a maximum temperature indicator.

Two types of thermochromic paint are known. The first, as described in U.S. Pat. No. 4,425,161, produce reversible colour change. The second produce irreversible colour change.

An example of the second, irreversible colour change type is described in U.S. Pat. No. 4,344,909. Thermochromic paint is provided which includes a pigment which decomposes to carbon black at a predetermined temperature and a sealant which requires that temperature to be reached to properly seal. The paint provides a visual indication that the necessary temperature has been reached to melt the sealant by turning black.

One problem with this thermochromic paint is that only one temperature change is indicated. Another problem with the described paint is that it is designed for operation at up to 400° C. which makes it unsuitable for applications in gas turbine engines where internal temperatures can be in the region of 700° C. Furthermore the black colour can be indistinguishable from carbon residues in an engine making borescope analysis difficult or impossible.

According to a first aspect of the present invention there is provided a thermochromic paint comprising:
  1 wt % to 90 wt % binder;
  2 wt % to 40 wt % filler comprising an inorganic oxide; and
  0.1 wt % to 28 wt % organic compound including a chromophore.

Advantageously the paint provides irreversible colour change at defined temperature or temperatures. Advantageously the paint does not include toxic (heavy) metals and therefore meets environmental requirements.

The binder may comprise an acrylic resin. Alternatively the binder may comprise a silicon resin. Alternatively the binder may comprise a mixture of acrylic resin and silicon resin. Advantageously acrylic resin sets at low temperature. Advantageously silicon resin binds well to high temperatures.

The organic compound may be selected from one or more of the structural classes: perylene diimides, porphyrins, boron-dipyrromethenes, azos, anthraquinones and phthalocyanines. The organic compound may be one or more Colour Index pigment. The organic compound may include one or more metal atom in its structure. The organic compound may be a coordination complex or organo-metallic.

The filler may comprise a distinctive colour. The distinctive colour may be white. Advantageously the filler is not black so that it is distinctive is comparison to decomposition products such as soot. The filler may comprise any one of: titanium dioxide; zinc oxide; aluminium oxide; magnesium oxide; silicon dioxide. Advantageously the paint does not react with components to which it is applied or within atmospheres in which it can be used.

The organic compound may comprise two or more coloured pigments, each coloured pigment comprising a chromophore selected to decompose at a different temperature. The organic compound may comprise three or more coloured pigments, each coloured pigment comprising a chromophore selected to decompose at a different temperature. Advantageously the pigments may be the same or different colours.

The thermochromic paint may comprise irreversible thermochromic paint. Advantageously the paint can be examined at ambient temperature after a component to which it is applied has been exposed to heating. Advantageously no temperature-resistant monitoring equipment is required to examine the paint. A thermochromic paint may comprise:
  46 wt % binder;
  11.6 wt % organic compound;
  12 wt % filler; and
  remainder solvent.

The binder may comprise 16 wt % silicon resin and 30 wt % acrylic resin. The organic compound comprises 5 wt % CI pigment red 3; 6 wt % CI pigment yellow 115; and 0.6 wt % CI pigment blue 15. Advantageously the paint indicates three different temperatures by including three pigments which decompose at distinct temperatures.

The present invention also provides a temperature indicator at least partially coated with the thermochromic paint as described above; or a component at least partially coated with the thermochromic paint as described above. Advantageously the paint can be applied directly to a component to be monitored. Alternatively a temperature indicator can be coated with the paint, temporarily lodged in the component and then removed for inspection.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
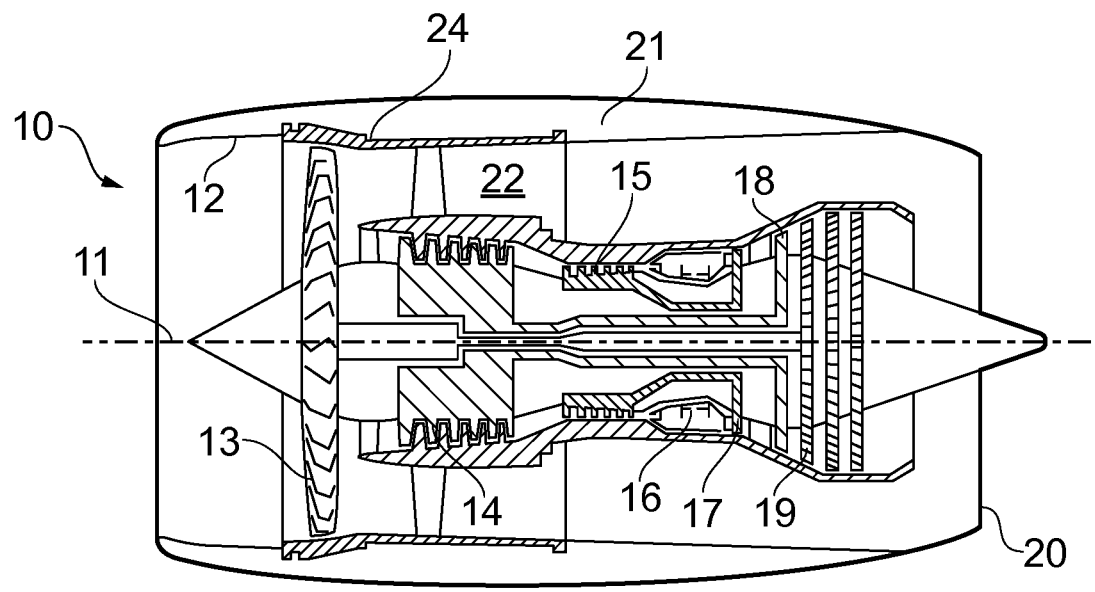
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
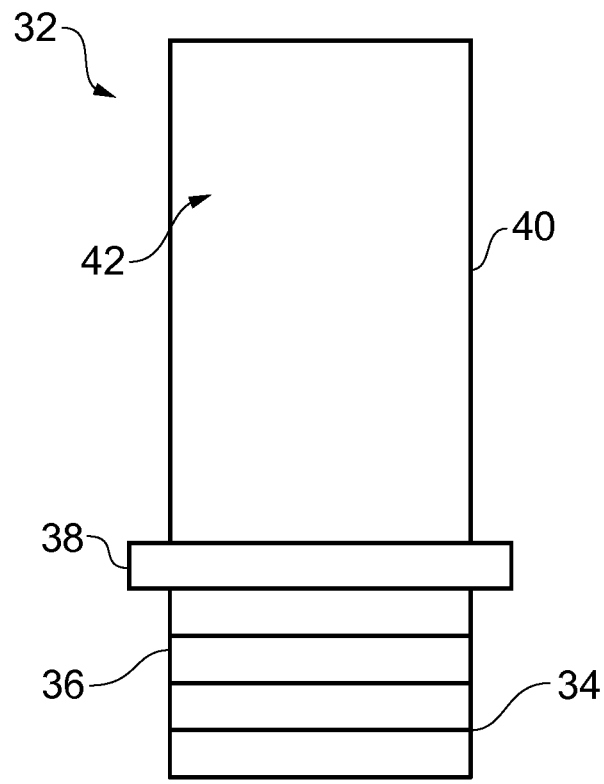
FIG. 2 is an enlarged view of a gas turbine engine turbine blade having a thermochromic paint coating.

A turbine blade 32 is shown in FIG. 2. It comprises a root 34, a shank 36, a platform 38 and an aerofoil 40. The turbine blade 32 has a thermochromic paint 42 applied onto regions of the aerofoil 40 or platform 38, by brushing, spraying etc. The irreversible temperature indicating paint 42 may also be applied to other components of the gas turbine engine, for example the turbine vanes, combustion chambers etc.

The thermochromic paint 42 is formulated of several elements: binder, filler and organic compound including a chromophore. Various proportions of these components are encompassed within the described paint 42, as will be elaborated below. The binder provides 1 wt % (weight percentage) to 90 wt % of the paint 42 composition; the filler provides 2 wt % to 40 wt % of the paint 42 composition; and the organic compound provides 0.1 wt % to 28 wt % of the paint 42 composition. The thermochromic paint 42 is stable to at least 1200° C.

The organic compound provides the colour change capability in the paint 42. The organic compound provides clear visual colouration due to the presence of one or more chromophore. It may be an organic pigment selected from the Colour Index (CI) or another organic compound including one or more chromophore. The organic compound may also contain a small quantity of metal in a coordination complex. For example, the organic compound may be selected from the chemical structure classes perylene diimides, porphyrins, boron-dipyrromethenes (BODIPYs), azos, anthraquinones and phthalocyanines. The organic compound is a coloured compound that decomposes at a defined temperature. In some formulations the organic compound comprises two or more coloured pigments that each decompose at different temperatures. The coloured pigments may be different colours. In other formulations the organic compound may comprise three or more coloured pigments that each decompose at different temperatures. Advantageously because the organic compound relies on a chromophore to provide the intense colouration it, or they, change colour at a specific defined temperature, or perhaps in a very narrow temperature range upon deactivation or destruction of the chromophore. Thus where the paint 42 is applied to a component it is possible to determine precisely the maximum temperature which the component has been subjected to.

The organic compound may comprise 0.1 wt % to 28 wt % of the paint 42 composition. In some formulations it may comprise 0.1 wt % to 15 wt % of the paint 42 composition. The proportion of the organic compound, and the ratio of each pigment within the compound, is important to set the initial colouration and the colours exposed by decomposition at temperatures. Less pigment is required where its colouration capacity is intense.

The binder may comprise a binding adhesive, an acrylic resin or a silicon resin. The binder works to adhere the pigment to the component. Alternatively the binder may comprise a mixture of acrylic and silicon resin. The acrylic resin sets at low temperatures, for example at ambient room temperatures, but decomposes at approximately 280° C. The silicon resin requires heat to set but once set binds well to very high temperatures. Thus the combination ensures the paint 42 sets at ambient room temperature but is stable to high enough temperatures for gas turbine engine operation. An exemplary silicon resin is sold under the trade name DC840 by Dow Corning Europe, of 62 Rue General De Gaulle, 1310 La Hulpe, Brussels, Belgium. An exemplary acrylic resin is sold under the trade name SYNOCRYL 9122X by Indestructible Paint Co Ltd, of 25 Pentos Drive, Birmingham B11 3TA.

The binder may comprise 1 wt % to 90 wt % of the paint 42 composition. In some formulations the binder may comprise 1 wt % to 50 wt % of the paint 42 composition. The proportion of binder required depends on the specific binder used.

The filler is chosen to be stable at temperatures which are expected in the application in which the thermochromic paint 42 is to be used. For example, for some gas turbine engine applications the filler should be stable up to at least 700° C. The filler is also selected to have a distinctive colour, for example to be a bright white. The filler comprises an inorganic compound. Specifically the filler comprises an inorganic oxide compound. In one formulation the filler comprises titanium dioxide ($TiO_2$). In other formulations the filler comprises aluminium oxide, zinc oxide, magnesium oxide or silicon dioxide. Advantageously the filler does not include toxic heavy metals such as lead so the paint 42 meets environmental requirements.

The filler may comprise 2 wt % to 40 wt % of the paint 42 composition. In some formulations the filler may comprise 2 wt % to 26 wt % of the paint 42 composition. In some formulations the filler may comprise 2 wt % to 15 wt % of the paint 42 composition. The proportion of filler in the paint 42 composition should be greater than the proportion of organic compound so that the filler remains when the organic compound decomposes at temperature.

Optionally the thermochromic paint 42 also includes a solvent. The solvent may provide 10 wt % to 50 wt % of the paint 42 composition. The solvent may provide 20 wt % to 40 wt % of the paint 42 composition. The solvent comprises a mixture of propylene glycol ethers, for example the solvent comprises a mixture of 80% 1-methoxy-2-propanol and 20% dipropylene glycol monomethyl ether. The solvent is sold under the trade name BANNERNOL E by Samuel Banner Co Ltd, of 59/61 Sandhills Lane, Liverpool, L5 9XL, England. The amount of solvent in the paint 42 is at least partially dependent on the method of application to the component to be heated, for example the turbine blade 32, as it affects the viscosity of the paint 42. Thus more solvent in the paint 42 means the paint 42 is less viscous and therefore more suited to bathing, spraying or flooding methods of application whereas less solvent in the paint 42 results in a more viscous formulation which is better for rolling or brushing.

Figure 3:
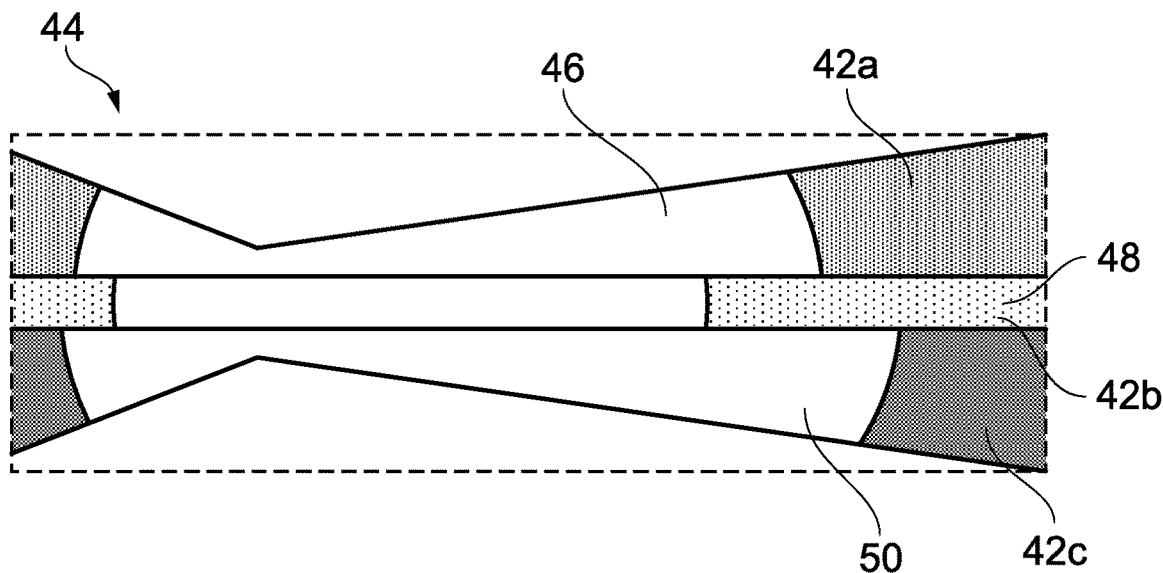
FIG. 3 is a drawing of a test piece comprising exemplary thermochromic paints after temperature exposure.

FIG. 3 shows a test piece 44 which is bow-tie shaped, of uniform thickness and of asymmetric shape. There is a pinch point, the narrowest portion of the test piece 44. To the left of the pinch point the test piece 44 is flared with a larger included angle than to the right of the pinch point. However, the right portion is longer than the left portion: that is it extends further from the pinch point.

The test piece 44 has been painted in three strips. The first strip 46 is painted with a first formulation of the thermochromic paint 42*a*; the second strip 48 is painted with a second formulation of the thermochromic paint 42*b*; and the third strip 50 is painted with a third formulation of the thermochromic paint 42*c*. The organic compound in the first paint 42a is blue (CI pigment blue 15); the organic compound in the second paint 42b is green (CI pigment green 7); and the organic compound in the third paint 42c is red (CI pigment brown 41). The test piece 44 was heated near the narrow portion of the bow tie shape. As can be seen in FIG. 3 the maximum temperature experienced at and close to the narrow portion of the bow tie is greater than the decomposition of all three paint formulations 42a, 42b, 42c. Thus the white filler is exposed indicating that temperature greater than the decomposition temperature of each paint formulation 42a, 42b, 42c has been experienced by that part of the test shape 44.

Figure 4:
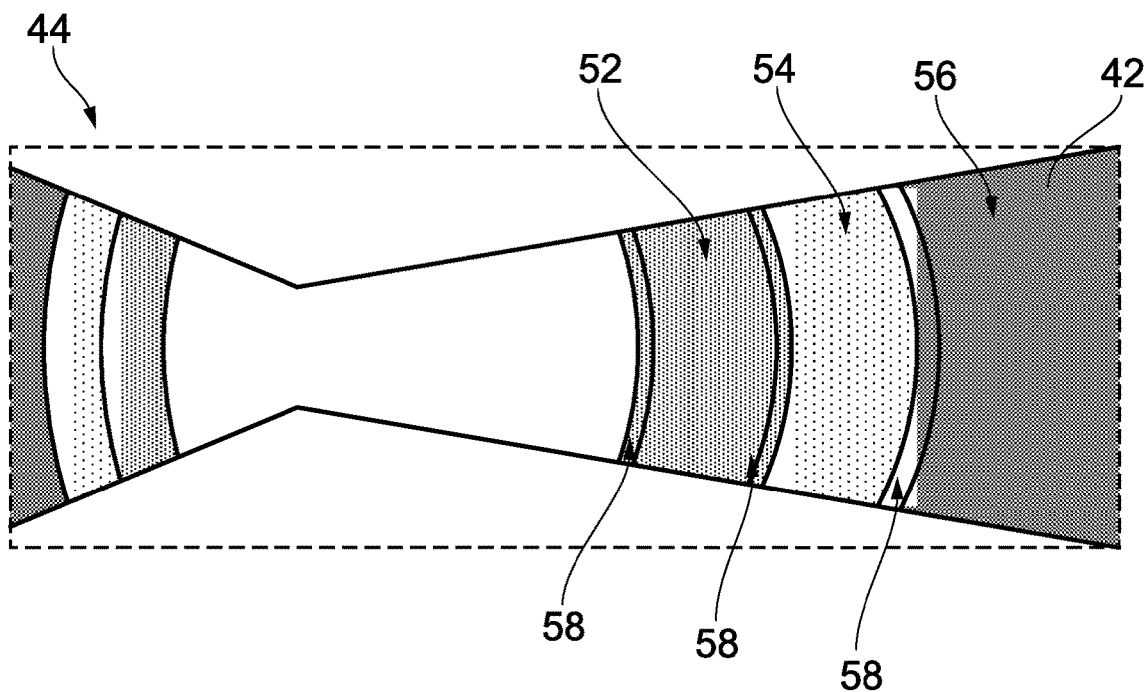
FIG. 4 is a drawing of the test piece comprising thermochromic paint after temperature exposure.
Figure 5:
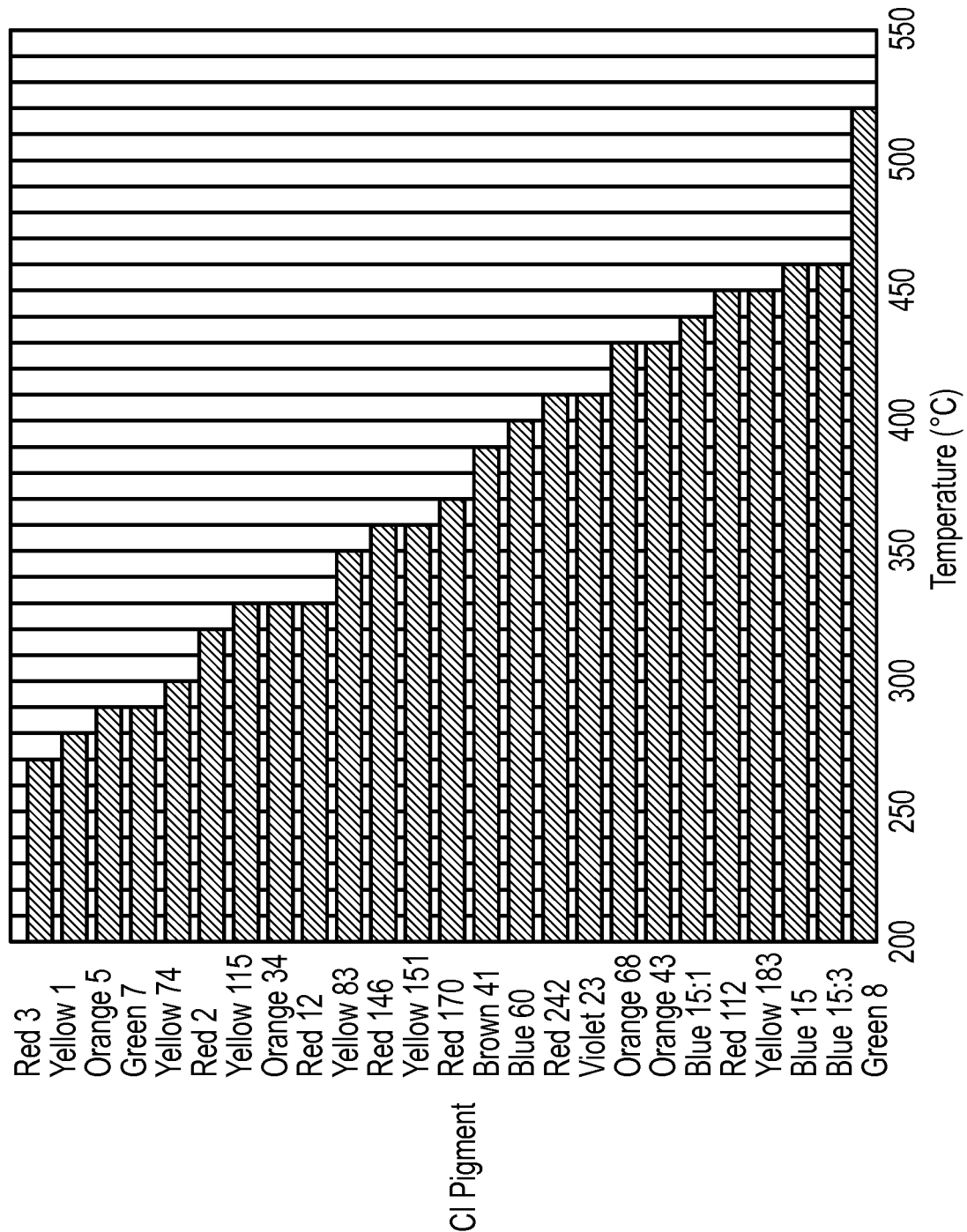
FIG. 5 is a graph showing the decomposition temperatures of various organic pigments for use in thermochromic paint.

It can also be observed that different lengths of paint 42 have been decomposed on each of the three strips 46, 48, 50. Thus viewed from the left or right of the figure the green paint 42b on the second strip 48 is the longest, the red paint 42c on the third strip 50 is the shortest and the blue paint 42a on the first strip 46 is the an intermediate length. The relative decomposition temperatures of the organic pigments in the three paints 42 from lowest to highest temperature are thus: red, blue, green. It can also be noted in FIG. 3 that the position at which the colour of the test piece 44 changes from the colour of the first, second or third paint 42a, 42b, 42c to the white of the filler is a reasonably well defined line. This is because the decomposition temperature of each paint formulation 42 is a specific defined temperature or, at worst, a small range of temperatures. Advantageously this clear delineation means the temperature indicating thermochromic paint 42 is well suited for applications in which it is important to ascertain which components or parts of components have been exposed to given temperatures.

Where two or more different coloured pigments are used then multiple colours will be displayed on the same component where different portions of the component have been subjected to different maximum temperatures, for example where heating was concentrated in one area of a component and surrounding areas were exposed less strongly to the heat source. This is illustrated in FIG. 4 in which a bow tie shaped test piece 44 has been coated all over with thermochromic paint 42 and then heated in the vicinity of the narrowest portion of the shape.

The thermochromic paint 42 used is formed from the following proportions: solvent Bannernol E approximately 30 wt %; silicon resin DC840 16 wt %; acrylic resin Synocryl 30 wt %; filler $TiO_2$ 12 wt %; and organic coloured pigments 11.6%. The thermochromic paint 42 includes three separate organic pigments: a red one (CI pigment red 3, 5 wt %), a yellow one (CI pigment yellow 115, 6 wt %) and a blue one (CI pigment blue 15, 0.6 wt %). The red pigment has the lowest decomposition temperature, the yellow pigment has a higher decomposition temperature and the blue pigment has the highest decomposition temperature. Advantageously the organic pigments are powerful so little is required to effect colour change. However, larger quantities of organic pigment may be used to intensify the colour changes and thus the distinction between colours.

The test piece 44 was heated by a point heat source, such as a lamp, in the vicinity of its narrowest portion. Thus this part of the test piece 44 was subjected to a greater temperature than any of the decomposition temperatures. The temperature experienced by the outer parts of the test piece 44, away from the point heat source, was progressively lower. Thus the decomposition of the organic pigments causes the colour banding as illustrated.

All the organic pigments have decomposed in the central region to expose the white filler, for example $TiO_2$. In the first band 52 the red and yellow pigments have decomposed but the blue pigment has not so the first band 52 is shaded blue. In the second band 54 only the red pigment has decomposed and so the second band 54 is shaded green due to the combination of blue and yellow pigments. In the third band 56 none of the pigments has decomposed and so the third band 56 is shaded red or slightly brown (depending on the mixture of the red, yellow and blue pigments). Thus the thermochromic paint 42 exhibits a step-wise temperature indication with the blue first band 52 indicating approximately 460° C., the yellow second band 54 indicating approximately 330° C. and the red third band 56 indicating approximately 180° C.

There are intermediate bands 58 between the central region and first band 52, first and second bands 52, 54, and second and third bands 54, 56. The intermediate bands 58 are more pronounced on the right of FIG. 4 where the test piece 44 is long and narrow relative to the left end of the test piece 44. These intermediate bands 58 show areas in which the temperature experienced by the test piece 44 is close to the decomposition temperature of the next pigment and/or is only briefly exposed to the decomposition temperature of that pigment so that only some of the pigment decomposes and thus the colour is not pure.

The thermochromic paint 42 described with respect to FIG. 4 has three primary coloured pigments forming the organic compound. Advantageously this means the bands 52, 54, 56 are clearly delineated because the colours are distinct from one another. In other paints 42 the decomposition temperatures of the various pigments may be in a different order by selecting different pigments, for example the yellow may have the highest decomposition temperature, the blue the next and the red pigment have the lowest decomposition temperature or some other order. In still other paints 42 within the scope of this disclosure two or more of the pigments may be the same colour, with a different colour pigment having a decomposition temperature between the decomposition temperatures of the same coloured pigments. For example a first red pigment, a green pigment and a second red pigment may be used where the first red pigment decomposes at the lowest temperature, the second red pigment decomposes at the highest temperature and the green pigment decomposes at an intermediate temperature. The relative proportions of the three pigments will define the visible colours as the paint 42 is exposed to rising temperatures, for example brown, green, red. This paint 42 is effective for indicating the maximum temperatures experienced by regions of a component or test piece 44 provided that a suitably sensitive visual analysis can be conducted. As will be apparent the relative proportions of each coloured pigment can be varied as well as the overall proportion of organic pigment in the paint 42.

An exemplary paint 42 uses CI pigment blue 27 as the organic compound. The pigment is iron (II,III) hexacyanoferrate (II,III) which is approximately 45% iron. Therefore although it is considered as an organic compound within this description it may also be termed an organometallic complex.

Advantageously the paint 42 is formulated from elements which are readily available commercially. For example the solvent and binder used may be conventional.

The thermochromic paint 42 finds utility in applications where it is important to determine whether components or parts of components have been exposed to predefined temperature levels and where it is either not possible or not desirable to continuously monitor temperature using a probe. The thermochromic paint 42 may be applied directly to a component to be monitored, for example a turbine blade 32 or other gas turbine engine component. Alternatively the thermochromic paint 42 may be applied to a temperature indicator which can be collocated with, attached to, or inserted into the component. The thermochromic paint 42 may be applied all over the component or temperature indicator. Alternatively it may be applied to only part of the component or temperature indicator. It may be arranged in a predefined pattern on the surface of the component or temperature indicator, for example stripes or a grid, or it may be applied as a uniform layer.

It may be beneficial to select the organic coloured pigments in order that one or more colour change occurs when a critical temperature is approached but not exceeded. Advantageously action can be taken to reduce the temperature when the warning colour is shown by the thermochromic paint 42 in order to prevent the component being exposed to the critical temperature. A further colour change may be arranged at a lower temperature than the warning temperature in order to indicate a trend towards heating which may ultimately result in the warning and then the critical temperatures being reached. Advantageously this provides an early warning of rising temperatures.

The colour changes of the thermochromic paint 42 are irreversible. Advantageously the article to which the paint 42 is applied can be examined for colour changes once it is cool. For example, a borescope may be inserted into a gas turbine engine 10 at a routine service and identify any painted parts of the engine which have been exposed to concerning temperatures. Alternatively the component or temperature indicator may be removed and inspected for colour changes. Where a separate temperature indicator is used, to which the thermochromic paint is applied, the temperature indicator may be removed and inspected after each use of the component it is used to monitor. For example, the temperature indicator may be releasably attached to or inserted into part of the gas turbine engine, for example through a borescope bung hole. After each flight, voyage or other use of the gas turbine engine 10 the temperature indicator may be removed and inspected. Alternatively the temperature indicator may be inspected less frequently, for example every few flights, engine cycles, voyages or uses. If no colour change has occurred it can be replaced for the next flight, voyage or use. If one or more colour change is apparent appropriate action can be taken: for example maintenance may be scheduled or brought forwards, immediate remedial maintenance or replacement may be arranged, or a more frequent monitoring may be instructed.

Although visually distinct organic compounds have been used in the example thermochromic paints 42 in some formulations the change causes by the decomposition of the chromophores may be detected by other methods.

Advantageously there are many organic compounds, including one or more chromophore, available which decompose at a range of different temperatures. Thus for each application a suitable compound or set of compounds can be chosen which decompose at temperatures of interest. For example, for an engine casing which is expected to operate at 460° C. but should not exceed 485° C. a set of compounds can be chosen which indicate 450° C., 460° C. and 490° C. In this way it can be easily seen whether the casing is operating at the expected temperature, below it or has exceed its expected operating temperature in which case inspection or maintenance may be instigated.

The thermochromic paint 42 may be applied to any component or to a temperature indicator used in a wide variety of applications and industries. The paint 42 may be used to indicate the maximum temperature experienced by components of a gas turbine engine 10 for powering an aircraft, marine vessel, or power plant. It may be used to indicate the maximum temperature experienced by components of a diesel engine; a nuclear power plant; or a pressure vessel. Advantageously the colour change may be visible through an inspection window or other remote system so that the nuclear power plant or pressure vessel need not be breached to check the temperature indication. The paint 42 may be used to indicate the maximum temperature experienced in the automotive industry; in manufacturing industries, particularly for manufacture of furnaces and ovens which need to operate at high temperatures; and in the ceramics industry. The paint 42 may also be used to monitor parts of a power plant to ensure that the effects of over-temperature events are identified and rectified.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An irreversible thermochromic paint comprising:
   1 wt % to 90 wt % binder;
   2 wt % to 40 wt % filler comprising an inorganic oxide; and
   0.1 wt % to 28 wt % organic compound, wherein the organic compound comprises two or more coloured pigments, and each coloured pigment comprises a chromophore selected to decompose at a different temperature.

2. The irreversible thermochromic paint as claimed in claim 1, wherein the binder comprises an acrylic resin.

3. The irreversible thermochromic paint as claimed in claim 1, wherein the binder comprises a silicon resin.

4. The irreversible thermochromic paint as claimed in claim 1, wherein the binder comprises a mixture of acrylic resin and silicon resin.

5. The irreversible thermochromic paint as claimed in claim 1, wherein the organic compound is selected from one or more of the structural classes: perylene diimides, porphyrins, boron-dipyrromethenes, azos, anthraquinones, and phthalocyanines.

6. The irreversible thermochromic paint as claimed in claim 1, wherein the filler comprises a distinctive colour.

7. The irreversible thermochromic paint as claimed in claim 1, wherein the filler comprises any one of: titanium dioxide; zinc oxide; aluminium oxide; magnesium oxide; and silicon dioxide.

8. The irreversible thermochromic paint as claimed in claim 1, wherein the organic compound comprises three or more coloured pigments, each coloured pigment comprising a chromophore selected to decompose at a different temperature.

9. The irreversible thermochromic paint as claimed in claim 1, further comprising 10 wt % to 50 wt % solvent.

10. The irreversible thermochromic paint as claimed in claim 1, comprising:
    46 wt % binder;
    11.6 wt % organic compound;
    12 wt % filler; and
    remainder solvent.

11. The irreversible thermochromic paint as claimed in claim 10, wherein the binder comprises 16 wt % silicon resin and 30 wt % acrylic resin.

12. The irreversible thermochromic paint as claimed in claim 10, wherein the organic compound comprises 5 wt % CI pigment red 3; 6 wt % CI pigment yellow 115; and 0.6 wt % CI pigment blue 15.

13. An irreversible temperature indicator at least partly coated with the irreversible thermochromic paint as claimed in claim 1.

14. A component at least partly coated with the irreversible thermochromic paint as claimed in claim 1.

\* \* \* \* \*